Patented Sept. 8, 1953

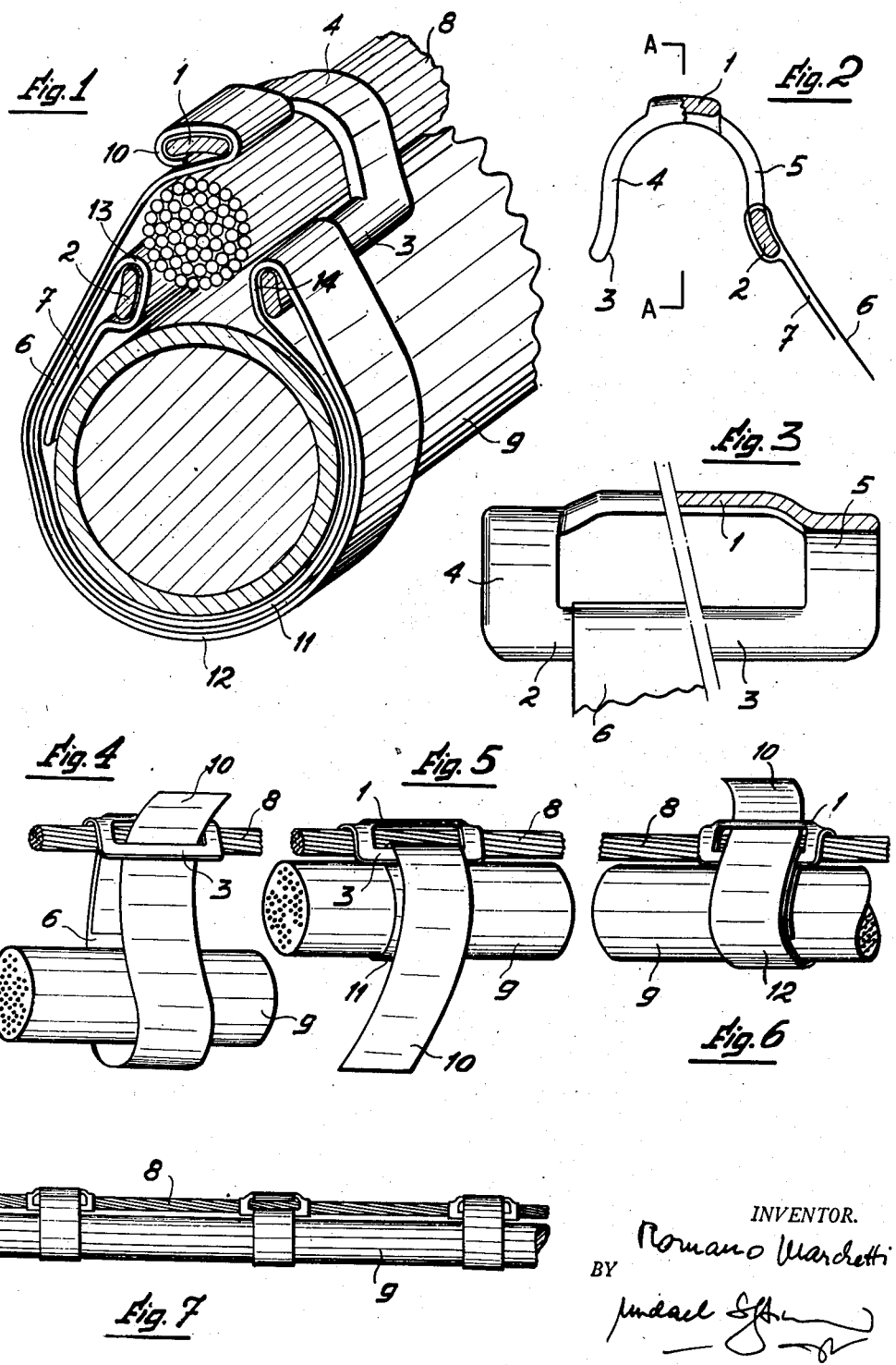

2,651,484

UNITED STATES PATENT OFFICE 2,651,484

DEVICE FOR SUSPENDING CONDUCTORS OR SIMILAR OBJECTS FROM LOAD ROPES

Romano Marchetti, Lecco, Italy

Application May 12, 1950, Serial No. 161,550
In France June 30, 1949

1 Claim. (Cl. 248—61)

The primary object of my present invention is to obtain a simple and cheap device that is easy to fix and serves to connect and suspend electrical conduction cables and similar objects with and from a load rope above them.

Another object of my invention is to obtain a suspension system that should bring about the connection between the cable to be suspended and the load rope, with a few easy and rapid operations.

A further object of my invention is finally to obtain a combination between the constructive particularities of the device as such, and the modalities of the system of application of the device itself, in order to ensure a rigid connection between cable and load rope, as well as a certain parallelism between both of the said elements, and at the same time to avoid a direct contact between the load rope and the electrical cable's surface, while not excluding the possibility that the device which constitutes the principal object of my invention, might also be used to suspend a movable cable running along the load rope—a provision that would answer certain necessities of practical application, especially when fixing cables above canals, rivers, roads with heavy traffic, and generally anywhere, where it is not convenient or even practicable to fix the suspension cable there and then in its definite place.

In its simplest form of execution, the device that forms the object of this invention is constituted by a member containing three parts that are substantially parallel among each other and that are substantially disposed along three generating lines of a cylinder, of equal distance among each other, such three parts being united among each other by head parts substantially folded in U-shape, all this in such a manner as to fashion the member like an open channel capable of containing the load rope in its full sectional size. In one of the side parts of such member a metal band is hooked in, that can be passed under the electrical cable to be suspended, folded round the part opposite the one to which it is originally hooked, passed again under the suspension cable, and finally folded back round the central part of the member, on top of the load rope.

In a preferred embodiment of my invention, the member is constituted by a properly shaped and folded metallic element, the central part of which is raised above the level of the head parts, while its side parts are sensibly distanced, so as to leave sufficient space between such side parts to allow the passage of the load rope between the said side parts, whenever the member is placed over the said rope, the space becoming insufficient to allow the rope to slip out, whenever the metallic band is folded round both the side parts, thus making it possible to tighten the said metallic band well round the electrical suspension cable without permitting the said cable to get into contact with the load rope.

In a particularly preferred embodiment of my invention, the metallic band is constituted by a piece of sheet zinc or equivalent metal, whose edges are slightly folded back such to avoid the contact of edges with the electrical suspension cable in order to avoid damaging the cable's surface.

The constructional details and practical application of the device that forms the object of this invention, are represented in the attached drawings, in which:

Fig. 1 represents a device fixed to rope and cable, in transversal section.

Fig. 2 shows the same, but before practical application, seen from one head part on the left hand half of the drawing and in transversal section on the right hand half of same.

Fig. 3 shows the same as Fig. 2, but seen from one side and, on the right hand side of the drawing, in section along the line A—A in Fig. 2.

Figs. 4, 5, and 6 represent the different phases through which the device is applied in practice.

Fig. 7 shows a length of cable connected with a load rope by means of a series of devices made and applied according to the invention.

Throughout the several figures, same numerals refer to same parts.

In Figs. 2 and 3 the device is seen to be constituted by a piece that may be realized in stamped sheet metal of a thickness and resistance proportionate to the size of the load rope and the weight of the cable to be suspended. This piece or member has three parts that are substantially parallel among each other, and precisely one central part 1 and two symmetrical side parts 2 and 3, all of them connected to the head parts 4 and 5. The device comprises a zinc sheet band 6 also, the top part 7 of which is wound round the side part 2.

The device is fixed by posing it astride on top of the load ripe 8 and winding the metal band 6 round the down side of the suspension cable 9, then introducing the band's end 10 upwards from inside to outside over the other side part 3 and tightening its sufficiently to obtain a first and inside layer 11 of binding connecting the cable 9 with the load rope 8 as seen in Figs. 4 and 5.

As shown in Figs. 5 and 6, the band's end 10 is then wound a second time under the cable 9 thus forming a second and outside layer 12 of binding. The band's end 10 is then passed underneath the central part 1 and, after a final tightening, wound round that part as shown in Fig. 1.

In this Fig. 1 is also shown how the load rope 8 that at first could pass between the side parts 2 and 3, is now closed between these parts 2 and 3 and the central part 1 by means of the layers of metallic band 13 and 14 wound round the said side parts 2 and 3 respectively. Another effect of these layers is that the surface of the suspension cable 9, although tightly bound by the two layers 11 and 12 and brought as near as possible to the load rope 8, can never actually touch the said load rope, while the said cable's surface is in contact only with the metallic band wound round its lower part.

The cable fixed as shown in Fig. 1 is held by, and connected with, the load rope also against longitudinal stress. However, if it seems convenient that the suspension cable should be free to run in a longitudinal sense, devices of a bigger size than the diameter of the load rope are used, thus avoiding any pressure between the layers 13 and 14 and the said rope even after assembling.

Having thus in detail described one form of my invention, I do not intend it to be considered limited solely to the precise form of execution described and represented above, because others, by following the spirit of my invention, might realize devices of a different construction, but in function equivalent to my above description. Therefore it should be understood that my invention comprehends the whole range of equivalence of its spirit and particularly the range defined in the appended claim.

What I claim as new and desire to secure by Letters Patent is:

Apparatus for suspending an elongated cable or the like from an elongated support which is substantially parallel to and spaced from the cable, comprising, in combination, a substantially semi-cylindrical elongated shell adapted to be located over the elongated support, said shell having an inner surface and an outer surface and being formed with a pair of slots extending along the length of said shell and being spaced inwardly from the ends thereof to form between the ends of said shells a pair of outer side bar portions and an intermediate bar portion adapted to be located on the elongated support; and an elongated flexible metal band having a width smaller than the length of said slots and being adapted to support the cable in spaced relation and substantially parallel to the elongated support, said band having a first portion at an end thereof adapted to be located next to the cable and extending along the inner surface of said semi-cylindrical shell about one of said side bar portions, a second portion forming a continuation of said first portion located over the latter and being adapted to extend about the cable next to the same, a third portion forming an extension of said second portion and extending along the inner surface of said semi-cylindrical shell about the other of said side bar portions, a fourth portion forming an extension of said third portion, being located over said second portion and extending past said one side bar portion of said semi-cylindrical shell on the outside thereof through the slot between said one side bar portion and said intermediate side bar portion and about the latter along the outer surface of said semi-cylindrical shell, and a fifth portion forming an extension of said fourth portion, being located at an opposite end of said band and extending about an edge of said intermediate bar portion to a point between the latter and said fourth portion of said band.

ROMANO MARCHETTI.

References Cited in the file of this patent

UNITED STATES PATENTS

| Number | Name | Date |
|---|---|---|
| 733,064 | Marsh | July 7, 1903 |

FOREIGN PATENTS

| Number | Country | Date |
|---|---|---|
| 972 | Great Britain | Mar. 23, 1868 |
| 475,944 | Great Britain | Nov. 29, 1937 |